United States Patent [19]
Knight

[11] Patent Number: 6,055,222
[45] Date of Patent: Apr. 25, 2000

[54] NEAR FIELD OPTICAL HEAD HAVING A SOLID IMMERSION LENS THAT IS FIXED RELATIVE TO AN OBJECTIVE LENS

[75] Inventor: Gordon R. Knight, Saratoga, Calif.

[73] Assignee: TeraStor Corporation, San Jose, Calif.

[21] Appl. No.: 09/265,730

[22] Filed: Mar. 9, 1999

Related U.S. Application Data

[63] Continuation of application No. 08/926,907, Sep. 10, 1997, Pat. No. 5,881,042, and a continuation of application No. 08/641,513, May 1, 1996, abandoned.

[51] Int. Cl.⁷ ................................................. G11B 7/00
[52] U.S. Cl. ...................... 369/112; 369/44.23; 369/119
[58] Field of Search .................... 369/44.14, 112, 369/44.15, 44.23, 119, 44.16; 359/819, 808, 811; 360/102

[56] References Cited

U.S. PATENT DOCUMENTS

| | | | |
|---|---|---|---|
| 4,633,450 | 12/1986 | Gueugnon | 369/13 |
| 4,753,521 | 6/1988 | Deserno | 359/663 |
| 4,965,780 | 10/1990 | Lee et al. | 369/13 |
| 4,987,292 | 1/1991 | Howard | 250/201.5 |
| 5,020,040 | 5/1991 | Lee | 369/13 |
| 5,112,662 | 5/1992 | Ng | 428/64 |
| 5,115,363 | 5/1992 | Khan et al. | 360/104 |
| 5,120,603 | 6/1992 | Schmidt | 428/336 |
| 5,121,256 | 6/1992 | Corle et al. | 359/356 |
| 5,128,216 | 7/1992 | Ng | 428/695 |
| 5,140,480 | 8/1992 | DeMoss | 360/102 |
| 5,153,870 | 10/1992 | Lee et al. | 369/111 |
| 5,161,134 | 11/1992 | Lee | 369/13 |
| 5,182,444 | 1/1993 | Howard | 250/201.5 |
| 5,191,563 | 3/1993 | Lee et al. | 369/13 |
| 5,197,050 | 3/1993 | Murakami et al. | 369/13 |
| 5,202,880 | 4/1993 | Lee et al. | 369/275.4 |
| 5,223,710 | 6/1993 | Pavlak | 250/230 |
| 5,232,570 | 8/1993 | Haines et al. | 204/192.16 |
| 5,243,241 | 9/1993 | Wang | 310/36 |
| 5,247,510 | 9/1993 | Lee et al. | 369/118 |
| 5,255,260 | 10/1993 | Yamada et al. | 369/199 |
| 5,260,928 | 11/1993 | Lee et al. | 369/112 |
| 5,288,997 | 2/1994 | Betzig et al. | 359/368 |
| 5,295,122 | 3/1994 | Murakami et al. | 369/13 |
| 5,307,336 | 4/1994 | Lee et al. | 369/112 |
| 5,381,402 | 1/1995 | Lee et al. | 369/291 |
| 5,432,763 | 7/1995 | Campbell et al. | 369/44 |
| 5,445,011 | 8/1995 | Ghislain et al. | 250/306 |
| 5,452,283 | 9/1995 | Lee et al. | 369/112 |
| 5,467,238 | 11/1995 | Lee et al. | 360/128 |
| 5,470,627 | 11/1995 | Lee et al. | 428/64.4 |
| 5,486,970 | 1/1996 | Lee et al. | 360/128 |
| 5,497,359 | 3/1996 | Mamin et al. | 369/44.15 |
| 5,541,888 | 7/1996 | Russell | 369/112 |
| 5,602,819 | 2/1997 | Inagaki et al. | 369/112 |
| 5,602,820 | 2/1997 | Wickramasinghe et al. | 369/126 |
| 5,729,393 | 3/1998 | Lee et al. | 359/819 |
| 5,764,613 | 6/1998 | Yamamoto et al. | 369/112 |
| 5,828,644 | 10/1998 | Gage et al. | 369/112 |
| 5,870,362 | 2/1999 | Boutaghou | 369/44.14 |

OTHER PUBLICATIONS

Maeda, Fumisada, et al., "High Density Optical Disk System Using a New Two–Element Lens and a Thin Substrate Disk", Research Center, Sony Corporation, pp. 342–344.

*Primary Examiner*—Tan Dinh
*Assistant Examiner*—Kim-Kwok Chu
*Attorney, Agent, or Firm*—Fish & Richardson P.C.

[57] ABSTRACT

A head for a disk drive for reading data from and/or writing data to an optical recording medium, having a slider with a channel surface and an air-bearing surface, an optical clear path through the slider, a solid immersion lens mounted at least partially within the slider, and an objective lens mounted to the slider, such that the distances between the air-bearing surface, the objective, and the solid immersion lens are substantially constant.

26 Claims, 6 Drawing Sheets

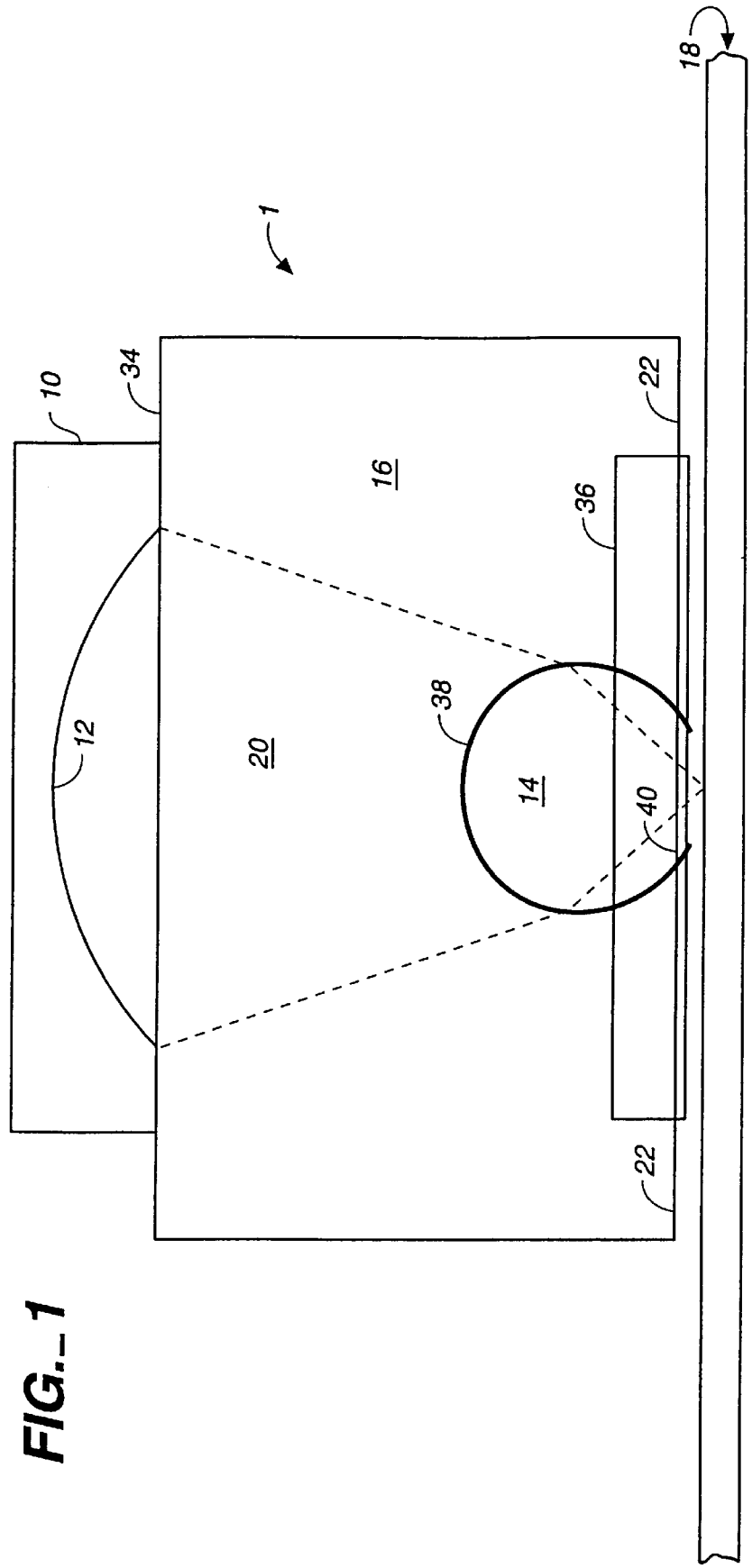
FIG._1

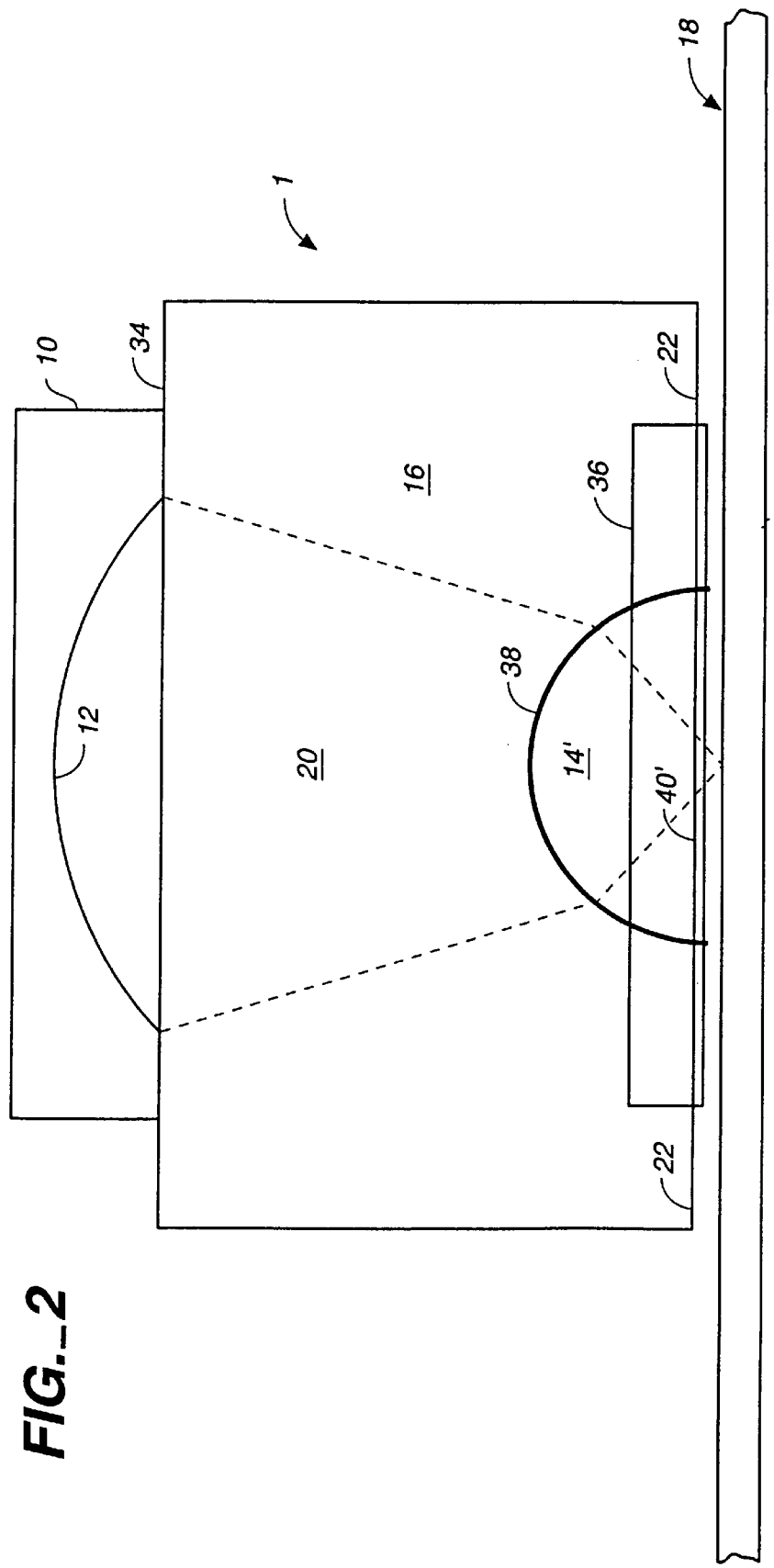
FIG._2

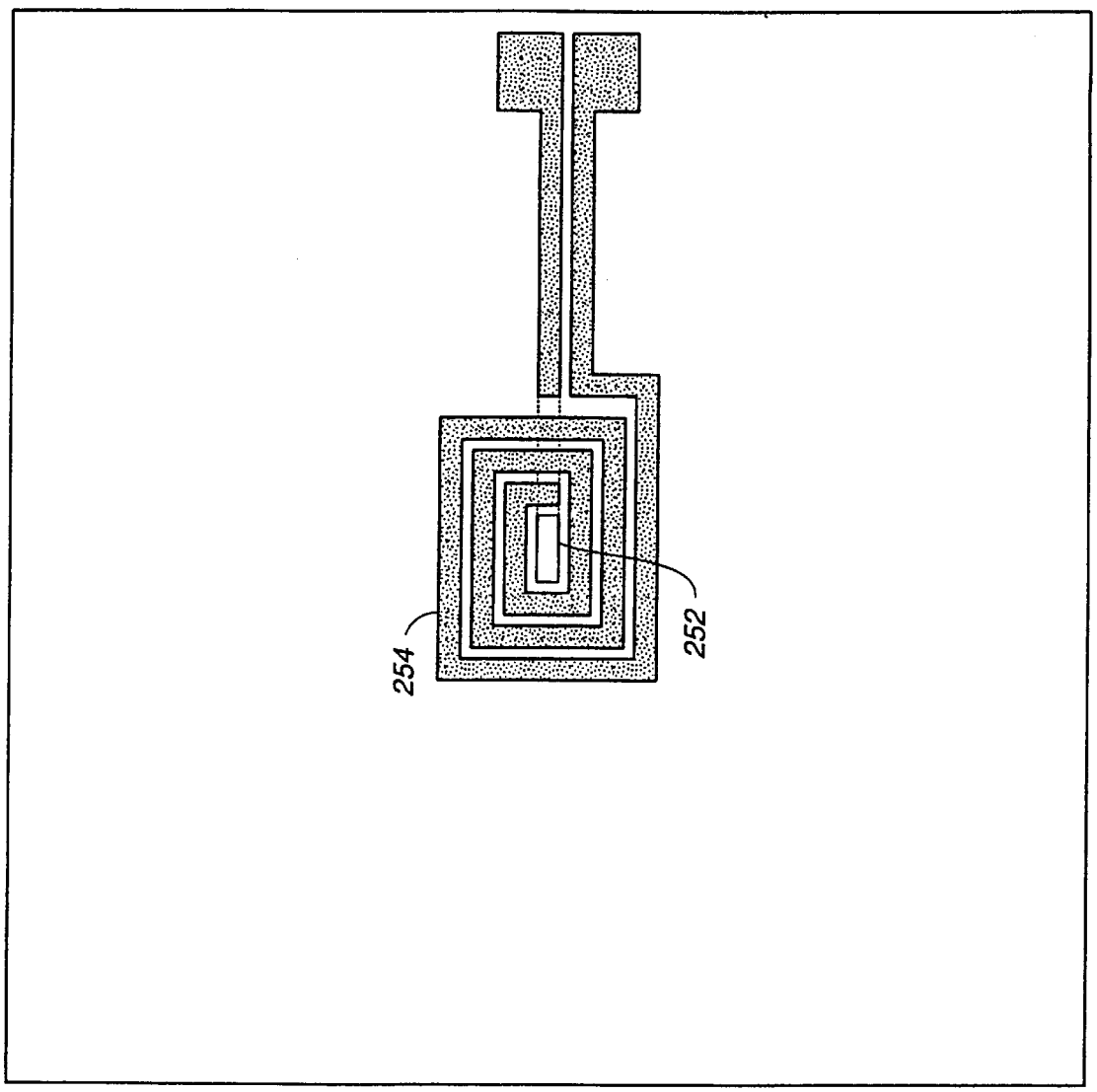
FIG._7
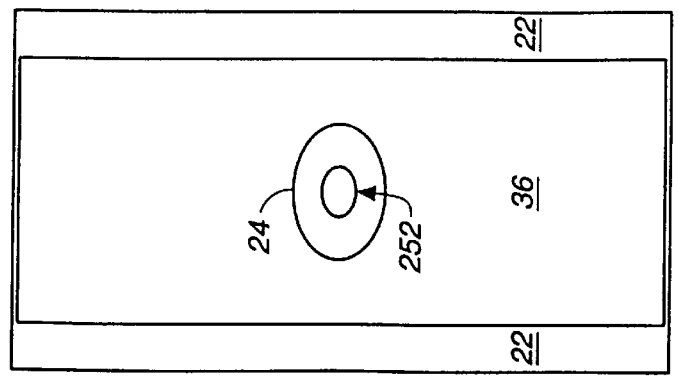
FIG._3

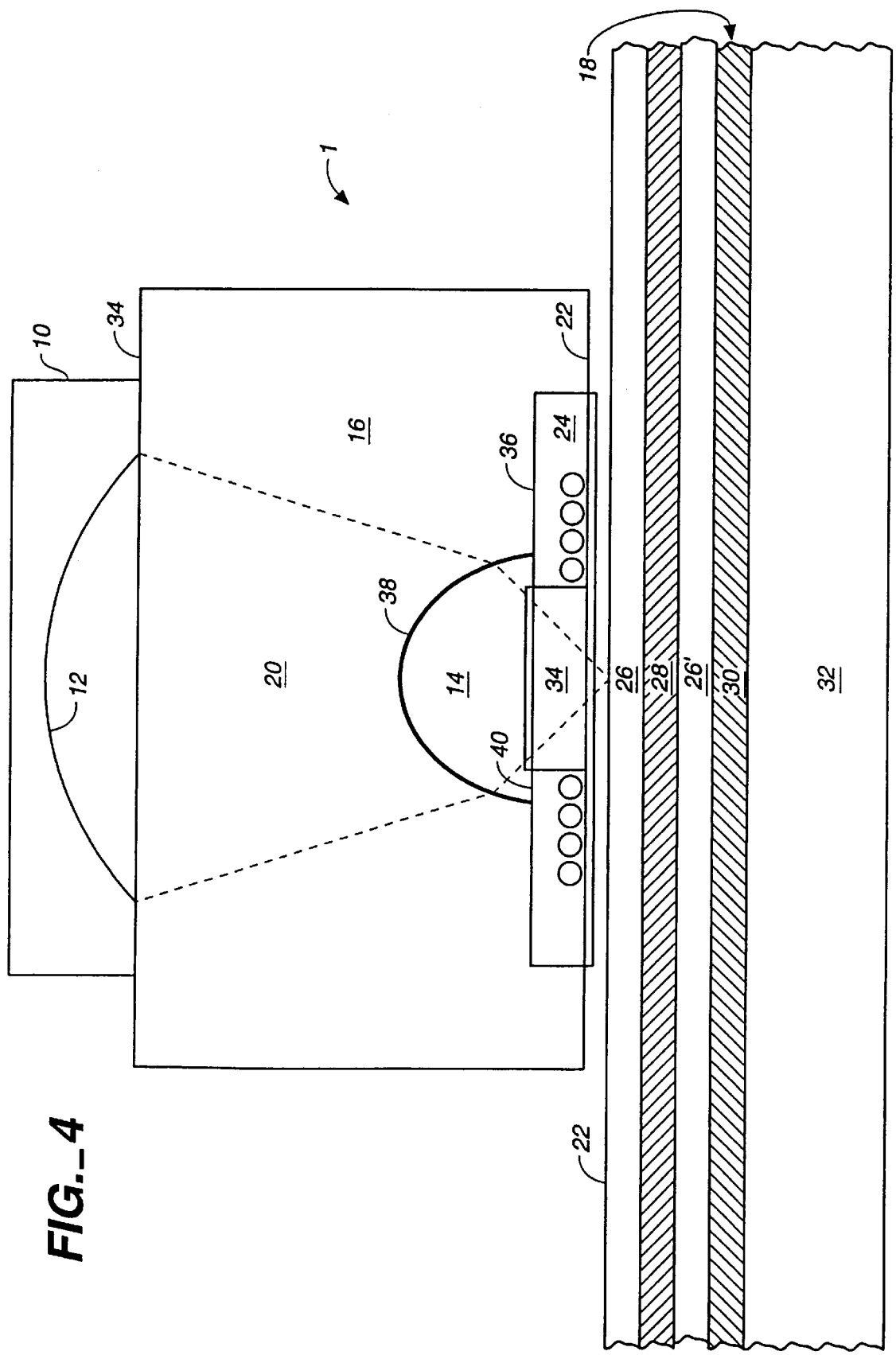
FIG._4

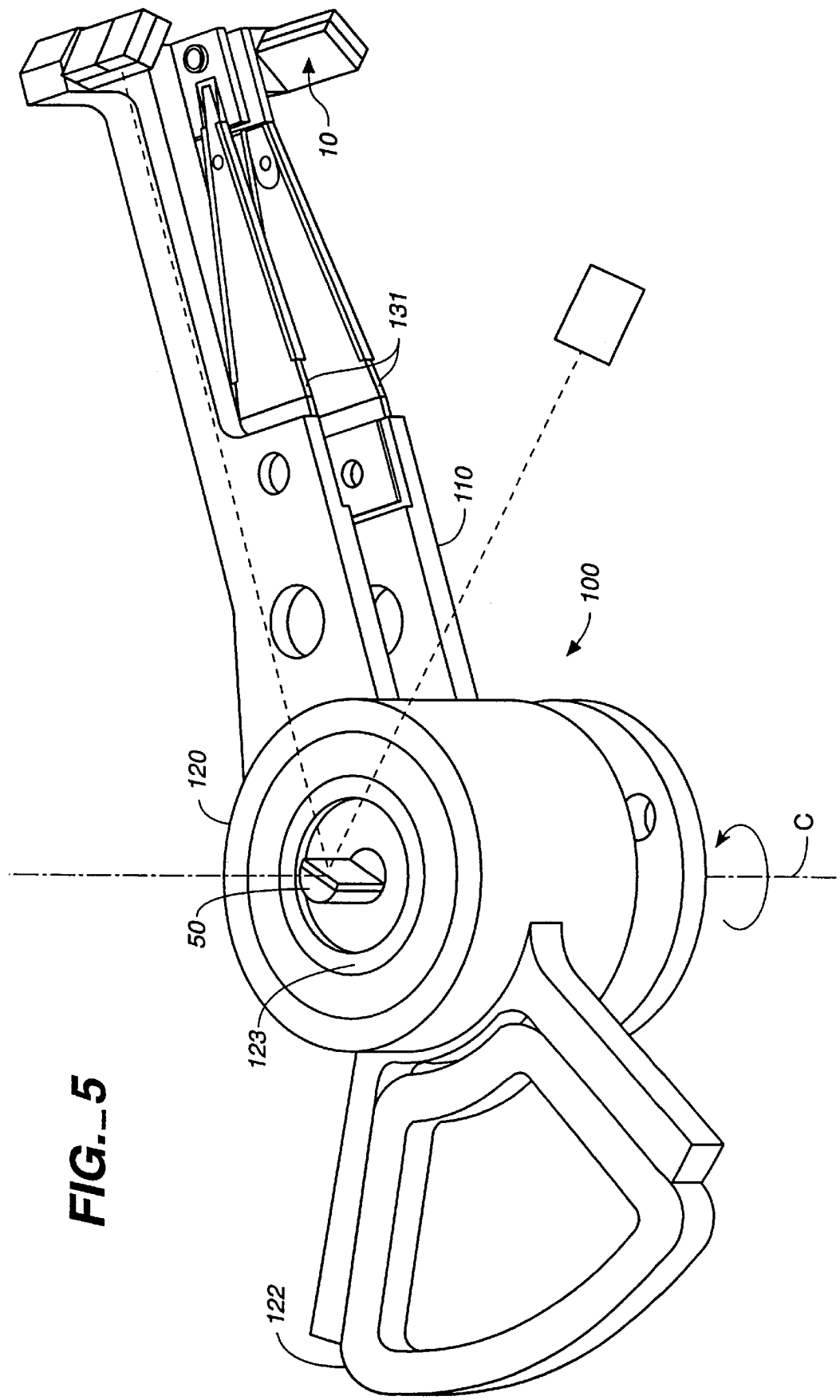
FIG._5

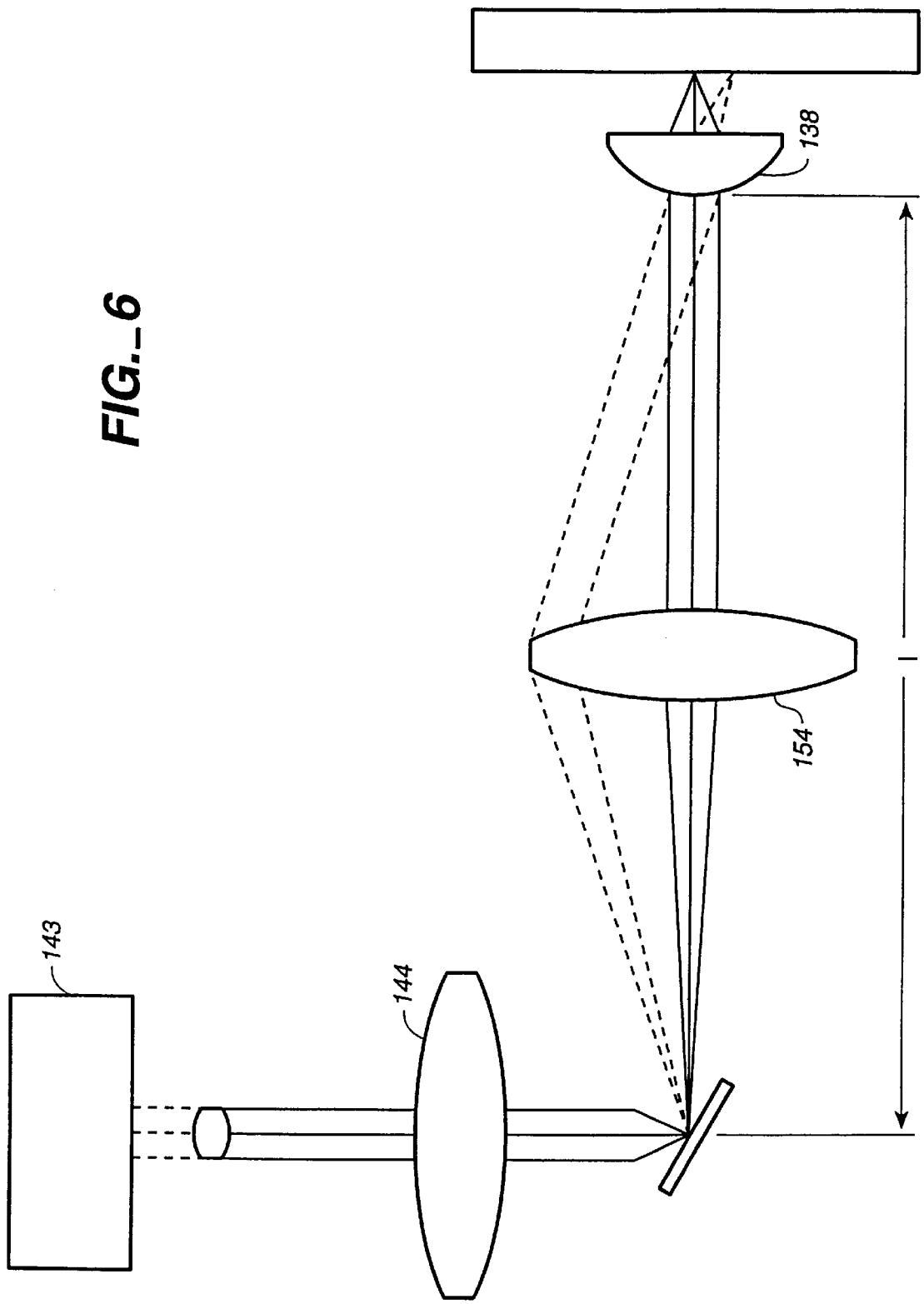
FIG._6

NEAR FIELD OPTICAL HEAD HAVING A SOLID IMMERSION LENS THAT IS FIXED RELATIVE TO AN OBJECTIVE LENS

This is a continuation of U.S. application Ser. No. 08/926,907, filed Sep. 9, 1997, now U.S. Pat. No. 5,881,042, which was a continuation of Ser. No. 08/641,513 filed May 1, 1996, now abandoned.

BACKGROUND

The present invention relates generally to heads for optical recording media, and more particularly to flying heads for disk drives having solid immersion lenses.

Optical data storage systems are of great commercial and academic interest because of their potential for very high data density. Unlike magnetic recording where data density may be limited by particle size, the density of optical recording may be limited by the diffraction limit of the illuminating light. In practice, the data density is in part also limited by how small illuminating radiation such as a laser beam can be focussed to on the disk.

To reduce the laser spot diameter, several methods can be employed. Higher frequency light may help matters because it has a smaller wavelength. Alternatively, increasing the numerical aperture of the lens may also help to decrease spot size.

An object of the invention is to provide an optical recording system in which a solid immersion lens (SIL) is used for optimum data densities. Another object of the present invention is to provide a flying head with an integral objective lens, solid immersion lens, and slider system so that the flying head may be maintained in focus, thus eliminating the need for a separate active focussing mechanism.

Additional objects and advantages of the invention will be set forth in the description which follows, and in part will be obvious from the description, or may be learned by practice of the invention. The objects and advantages of the invention may be realized and obtained by means of the instrumentalities and combination particularly pointed out in the claims.

SUMMARY OF THE INVENTION

The present invention is directed to a head for a disk drive for reading data from an optical recording medium having a slider with a top surface, a channel surface, and an air-bearing surface. The slider has an optical clear path through its body and a solid immersion lens mounted at least partially within. The solid immersion lens has a partial spherical surface and a flat portion. The flat portion may be a flat surface of the partial sphere or a flat plate. An objective lens can be mounted to the slider. The partial spherical surface of the solid immersion lens faces the objective lens and the distance between the air-bearing surface and the objective lens is constant.

The objective lens can be a micro-focussing objective. An optical clear path within the slider passes electromagnetic radiation back and forth from this objective lens to the spherical surface of the solid immersion lens. This radiation is focussed on or near the flat surface of the solid immersion lens and can be evanescently coupled to the optical recording medium. The flat surface of the solid immersion lens can be co-planar with or in the vicinity of the air-bearing surface.

The invention can operate in the near-field regime, such that the distance between a top surface of the optical recording medium and the air-bearing surface is less than one wavelength of the incident light.

The SIL may have the shape of a hemisphere or super-hemisphere. In the latter case, the thickness of the super-hemisphere may be less than or about r+r/n, where r is the radius of the partial spherical section and n is the index of refraction of the constituent material of the super-hemisphere.

In an alternative embodiment, the solid immersion lens may have the shape of a partial sphere of lesser thickness than that above, such that the sum of the thickness of the partial sphere plus the remainder of the optical path in the slider below the SIL is up to r+r/n. In the same way, where the solid immersion lens is a hemisphere, the sum of the thickness of the partial sphere plus the remainder of the optical path in the slider below the SIL is equal to r.

The flying head may be used to write data to a magneto-optical recording medium using a magnetic field. In this case, the head includes a coil located generally in the vicinity of the channel surface of the slider. The coil may be a micro-coil, or may be fabricated on a printed microcircuit. The coil is fabricated generally adjacent to the central flat surface of the solid immersion lens and can be integrated into the slider.

A power supply supplies current to the coil. This current produces a magnetic field of strength between 50 and 300 oersteds, although other fields may also be generated. This magnetic field can be perpendicular to the surface of the optical recording medium. The field may be switched to a different direction at rates greater than 20 megabits per second.

The coil generally defines an opening in its center such that electromagnetic radiation traveling in the optical clear path can pass through the opening. The opening can be elongated in a cross-track dimension.

The optical recording medium may be a magneto-optical material deposited on a media substrate. Between the magneto-optical material and the media substrate is often located a reflector layer. Such a layer may be made of a material such as aluminum. On the side of the magneto-optical material opposite the media substrate may be located a transparent dielectric such as silicon nitride for protection of the optical recording medium. The media substrate can be, e.g., plastic, glass, or aluminum. The optical recording material can also be of a phase-change type. In this case a coil is not required. If the optical medium is a read-only disk, a selectively reflective material which may be located on a media substrate can be used, and the same can be covered with a transparent dielectric for protection.

A fine tracking actuator for guiding an optical beam can be employed, such as a galvanometer. This fine actuator is generally located close to the flying head, or can be imaged in the vicinity of the front focal point of the objective lens.

A rotary or linear coarse actuator on which is mounted the slider can be used for coarsely accessing any track on the optical recording medium.

A reflector such as a mirror or prism mounted on the slider above the objective lens can also be provided for guiding a laser beam into the objective lens on the slider. Alternatively, the same reflector may be mounted on an arm tied to the coarse actuator located above the objective lens.

The numerical aperture of the objective lens may be between 0.45 and 1.0, the index of refraction of the solid immersion lens may be between 1.4 and 2.5, the mass of the objective lens may be less than about 35 milligrams, and the radius of the spherical portion of the solid immersion lens may be less than about 2 millimeters.

Finally, collimating optics may be used to guide a laser beam towards the reflector and into the objective lens.

BRIEF DESCRIPTION OF THE DRAWINGS

The accompanying drawings, which are incorporated in and constitute a part of the specification, schematically illustrate the invention and, together with the general description given above and the detailed description given below, serve to explain the principles of the invention.

FIG. 1 is a sectional view of an optical head according to the present invention using a super-hemispherical SIL. The optical head is shown located above an optical recording medium.

FIG. 2 is a sectional view of the optical head according to the present invention using a hemispherical SIL, again shown above an optical recording medium.

FIG. 3 is a bottom view of the optical head of either FIG. 1 or FIG. 2.

FIG. 4 is a side sectional view of a slider incorporating an optical head according to the invention. This embodiment includes a magnetic coil for writing data magnetically to a recording medium. An optical recording medium structure is also shown.

FIG. 5 is a perspective view of a rotary actuator which can be used with the present invention.

FIG. 6 is a diagram of an example of collimating optics which can be used with the present invention.

FIG. 7 is a bottom view of a printed circuit coil surrounding an aperture which can be used in the present invention.

DESCRIPTION OF THE PREFERRED EMBODIMENTS

FIG. 1 is a diagram of an embodiment of the invention. A head 1 is shown located generally adjacent a disk 18, as in a disk drive. Disk 18 is also referred to herein as an optical recording medium. In this position, head 1 may be reading data from or writing data to disk 18.

Head 1 is shown as having constituent optics together with slider 16. The constituent optics are described below. Slider 16 has a top surface 34 and a channel surface 36. Slider 16 also has air-bearing surfaces 22. These air-bearing surfaces 22 can be designed to ride at a predetermined height above the disk 18 while disk 18 is rotating at a specific speed. By virtue of being carried by the air-bearing surfaces 22, head 1 can also ride at a predetermined height.

The distance between head 1 and disk 18 can be quite small. Head 1 can operate in the "near-field" regime, where "near-field" is often used to refer to the situation where the spacing between the head 1 and the disk 18 is less than the wavelength of the illuminating radiation and also where the numerical aperture of the entire lens system is greater than unity.

The constituent optics may include a reflector 10, an objective lens 12, and a solid immersion lens (SIL) 14. Each of these may be mounted to the slider 16. SIL 14 can be substantially or entirely contained within the slider 16. Objective lens 12 is mounted onto or near the top surface 34 of the slider 16 to focus the incident electromagnetic radiation, such as a laser beam, onto the SIL 14. An optical clear path 20 is provided between SIL 14 and objective lens 12 so that the electromagnetic radiation such as a laser beam may be effectively transmitted from one to the other and back again.

Between the objective lens 12 and the SIL 14 can be an optical clear path 20. This optical clear path 20 is constituted of any optically transparent material, and may be air, glass, optically clear plastic, and so on.

The electromagnetic radiation travelling through the optical clear path 20 can be incident on the partial spherical surface 38 of the SIL 14. The SIL can be a single glass partial sphere or a lesser portion of a partial sphere plus a glass flat. The SIL 14 generally has a spherical surface 38 surrounding the partial spherical portion and a flat portion 40, which may be a surface or a flat plate. These latter two surfaces may be entirely contained within the body of the slider 16. The flat portion 40 may be generally co-planar with or in the vicinity of the air-bearing surface 22. Such geometry can assist the flight of the head over the disk, and forms part of the total slider air bearing surface.

At least two versions of the SIL may be used in the present invention. An embodiment using a super-hemispherical SIL 14 is shown in FIG. 1, and an embodiment using a hemispherical SIL is shown in FIG. 2.

The hemispherical SIL 14' is shaped as a hemisphere and has a flat portion 40' which can wholly contain at least one diameter of the partial spherical section. The super-hemispherical SIL 14, on the other hand, as shown in FIG. 1, is a truncated sphere. The flat surface of the super-hemispherical SIL 14 contains no complete diameters of the spherical section (although it may intersect at least one diameter at one point). Because this constitutes a hemisphere plus a "zone of a sphere", where the latter is defined as the portion of a sphere contained between two parallel planes both intersecting the sphere, it is termed a "super-hemisphere".

The SIL 14 or 14' focusses the laser beam in the near vicinity of flat portion 40 or 40'. For convenience, we discuss the unprimed elements, although the same statements may be made for the primed. The converging rays from the objective lens 12 enter the partial spherical surface 38 of the SIL 14. Placement of the SIL 14 in the system then can focus the spot in proximity to the flat bottom portion 40 of the SIL 14. This is because the incoming converging rays from the objective lens 12 are refracted at the surface 38 of the partial spherical lens section, which can result in an increased effective incident angle. This then can result in an increase in the effective numerical aperture. In a hemispherical SIL, the increased effective numerical aperture can rise with n. In a super-hemispherical SIL, the increased effective numerical aperture can rise as $n^2$.

The focussed beam thus converges near the flat portion 40 of the SIL 14. The disk 18 is located less than a wavelength away from the flat portion 40 of the SIL 14 in the near-field situation. In this way, evanescent waves may couple the small spot near or on portion 40 to the disk 18. These evanescent waves generally extend a distance less than a wavelength from the flat portion of the SIL 14 before being significantly attenuated. In the case where the near-field situation is not used, i.e. where the total numerical aperture is less than unity, the disk may be further from the flat surface of the SIL.

Because the objective lens 12, optical clear path 20, and SIL 14 can all be mounted to slider 16, they can be stationary with respect to one another. Therefore, a beam which is focussed can be so maintained so long as the distance between the SIL 14 (or any other component of the head 1) and the disk 18 is maintained constant. This last condition may be met if the disk is rotating at operating speed and the air-bearing surfaces 22 are functioning properly. Therefore, there is no need for active focussing, as a proper focus can be maintained automatically because of the geometry of the system.

Occasionally it is desired to tilt the properly focussed beam to one side or the other in order to write to or read from a track adjacent to the one directly under the untilted beam. This tilting of the beam can be performed by a turning mirror such as a galvanometer. The tilted beam can pass unhindered to the disk through the objective lens and the SIL. There is also occasionally the need to better guide the laser beam into the objective lens 12 on the slider 16. To accomplish this, a reflector 10 may be located above the objective lens 12, but still on the slider, to guide the beam into the objective lens. This reflector 10 may be, e.g., a mirror or prism. The reflector may alternatively be mounted on an arm tied to the coarse actuator, as shown in FIG. 5 as element 10.

The system described above can be used to read data from an optical disk and to write data to a phase-change type or similar writable disk.

Alternatively, data may be written to a magneto-optical disk by also employing a separate magnetic field. In another embodiment of the invention, as shown in FIG. 4, a magnetic coil 24 is employed to create a magnetic field for interaction with the optical recording medium. This coil 24 can be co-axial with the SIL 14. In this case, the strongest point of the vertical magnetic field can be nearly coincident with the focussed beam on the recording medium. Like the SIL 14, this coil 24 can be integrated into the body of the slider 16.

Mesa 34 may be employed to serve as the lower section of SIL 14 as shown in FIG. 4. Mesa 34 allows for the removal of part of the SIL. As the refracted light does not extensively use the lower periphery of SIL 14, there is less need for the lower periphery of the SIL. By removing it, more room can be gained for the placement of coil 24.

Mesa 34 can be grown using known techniques onto SIL 14. Alternatively, the area around mesa 34 can be etched or mechanically removed. Mesa 34 can be integral and constituted of the same material as SIL 14.

The magnetic coil 24 can be current-driven by an appropriate power supply to create a vertical field approximately perpendicular to the plane of the coil 24. This magnetic field can be switchable to write data. Rates up to and much greater than 20 megabits per second can be used. The field can have a magnitude of about 50 to about 300 oersteds, although other fields could also be accommodated.

For convenience in a particular setup, the coil may be located away from the flat portion 40 of the SIL 14 to reduce the total air bearing surface of the slider. In another implementation, the plane of the coil 24 may be perpendicular to the plane of the disk 18. In this case, a device such as a permanent magnet or an electromagnet of proper geometry may be used to steer the field around a 90° angle so that it again can couple to the disk.

An alternative embodiment in which the coil is a printed micro-circuit coil 254 is illustrated in FIG. 7. In this case, the focussed light beam from the objective lens/SIL combination can exit through the clear operture 252.

Because such a coil can circle the base of the SIL 14, its center opening generally allows for the focussed laser beam to pass through. The shape of the coil and its opening may be elongated in one direction, as shown in FIG. 3 and described above, to allow a beam to tilt in an unhindered manner in the tracking dimension on the optical disk medium. In this way, the coil 24 may be as close as possible to the mesa 34 without interfering with the beam path.

Referring to FIG. 4, the optical recording medium can be a magneto-optical material 28 or a phase-change type material deposited on a media substrate. The magneto-optical material may be a rare earth-transition metal compound. Examples of suitable such magneto-optical materials are TbFeCo.

To increase the signal, a reflector layer made of a material such as aluminum can be placed between the magneto-optical material and the media substrate.

For protection of the magneto-optical material, on the side of the magneto-optical material opposite the media substrate can be located a transparent dielectric material 26 such as silicon nitride. The media substrate can be plastic, glass, or aluminum.

If optical reading only is desired, such as for a read-only disk, a selectively reflective material 30 located on a media substrate 32 can be used. This may also be covered with a transparent dielectric layer 26' for protection. For example, the selectively reflective layer can be composed of a number of pits or other non-reflective spots which serve to modulate the reflected light and thus read-back information.

The constituent optics can vary, although objective lens 12 can have a micro-focussing feature and an individual numerical aperture of 0.45 to 1.0. It may be made of, among other materials, glass or plastic. It has a mass typically of less than 35 milligrams.

The partial spherical portion of either the hemisphere or super-hemisphere can have a radius of less than or about 2 millimeters. The SIL material's index of refraction can be in the range of 1.4 to 2.5.

In the case of a super-hemispherical SIL 14, the total thickness thereof can be up to $r+r/n$, where r is the radius of the partial spherical section and n is the index of refraction of the constituent material of the super-hemisphere. If a thickness of less than $r+r/n$ is used, the SIL 14 may still be used. In this case, the amount by which the thickness is less than $r+r/n$ can be made up by an equivalent optical distance of an optical flat plate in the slider 16 or a top dielectric coating on the optical recording medium, or both. The same is true in the case of a hemispherical SIL 14'.

A separate fine tracking actuator for guiding an optical beam may be used, such as a galvanometer, as shown in FIG. 5 as actuator mirror 50.

For larger translations, a linear or rotary coarse actuator as shown in FIG. 5 as element 100 may be used, on which can be mounted the slider 16. A rotary coarse actuator as shown includes a coil 122, a rotary motor 120 and 123, the arm 110 and the flexure 131. This coarse actuator may then be used for accessing any track on the optical recording medium.

Collimating optics may be used to steer a laser beam towards the reflector 10 in those situations where a reflector 10 is employed. Such collimating optics are also shown in FIG. 6, and generally include such elements as laser collimator pen 143, collimating/corrections lens 144, imaging lens 154, and objective/SIL lens 138.

In summary, an optical flying head with an integrated solid immersion lens has been described.

The present invention has been described in terms of preferred embodiments. The invention, however, is not limited to the embodiment depicted and described. For example, variations in materials (and therefore variations in indices of refraction) of the optical components may be used, as well as certain variations in their optical parameters such as focal length and numerical aperture. Moreover, the invention may be used in a number of types of optical recording and playback.

Therefore, the scope of invention is defined by the appended claims.

What is claimed:

1. An optical head, comprising:

an optical head support element, having a top surface, a bottom surface which is shaped to form an air bearing surface in operation, said bottom surface facing away from said top surface, said optical head support element having an inner channel defining a path which is optically clear to couple radiation energy;

a first lens coupled to said top surface;

a second lens coupled to said bottom surface such that a distance between said first and second lenses remains fixed; and wherein said first lens and second lens are of a type which enable near-field optical operation; and a beam tilting element, outside of said optical head support element, which tilts a beam of the radiation energy to change an output position of the beam at said second lens.

2. A head as in claim 1 wherein said first lens is an objective lens.

3. A head as in claim 1 wherein said second lens is a solid immersion lens.

4. A head as in claim 1 wherein at least one surface of said second lens is substantially flat.

5. A head as in claim 4 wherein said one surface of said second lens forms a portion of the air bearing surface.

6. A head as in claim 1 further comprising a coil, coupled to said bottom surface.

7. A method of operating an optical system in near field mode, comprising:

forming an optical element holding assembly, including a first lens coupled to a top surface thereof, and a second lens coupled to a bottom surface thereof, said first and second lenses mounted in a way such that they are positioned stationary relative to one another, and with an optically clear path between said first lens and said second lens; and configuring said bottom surface as an air bearing surface;

rotating a disk at a desired speed adjacent said air bearing surface to maintain constant a distance between the second lens and the disk to thereby automatically maintain proper focus without moving said first lens and said second lens relative to one another; and tilting a properly focused beam to change a beam position at said second lens using an external beam tilting device.

8. A method as in claim 7 further comprising creating a magnetic field, on said optical holding element, and using said magnetic field to interact with the disk.

9. A method as in claim 8 wherein said first lens is an objective lens, said second lens is a solid immersion lens, and said objective lens and solid immersion lens are held immovable relative to one another.

10. A method as in claim 7 further comprising using said first and second lenses to guide a beam to the disk;

providing a magnetic coil, coupled to said air bearing surface, and coaxial with said second lens, and using said coil to produce a magnetic field which is nearly coincident with a position of a focused beam on the disk.

11. A method of near field recording, comprising:

forming an optical head assembly which has a first and second lens optically in series with one another with an optical clear path therebetween, said first and second lenses and said optical clear path rigidly positioned relative to one another;

shining light onto an optical disk through said optical head assembly;

using a light direction altering element to tilt light output from the optical head assembly;

maintaining said optical head assembly at a predetermined distance above the optical disk, during a predetermined operation of the optical disk in which the optical disk is spinning at a predetermined speed, said predetermined distance being less than a wavelength of said light; and carrying out at least one of a reading or writing operation with the optical disk without active focusing.

12. An optical head comprising:

an optical holding element;

a first lens rigidly coupled to said optical holding element near a top surface thereof and a second lens rigidly coupled to said optical holding element near a bottom surface thereof, said second lens having a substantially flat portion on a bottom surface thereof and at least portion of said substantially flat portion forming an air bearing surface; and a beam tilting element, outside said optical holding element, to change a position of a beam output from said optical holding element.

13. A head as in claim 12 wherein said bottom surface of said second lens also forms a mesa having side surfaces.

14. A head as in claim 13 further comprising an electrical coil, wrapped around said side surfaces.

15. An optical head device, comprising:

a component holding element including a top surface, a bottom, air bearing surface facing away from said top surface, and an optically clear portion through which radiation energy is coupled;

a first lens coupled to said optically clear portion at a predetermined position in the optically clear portion;

a second lens, also coupled to said optically clear portion, at said air bearing surface, said second lens having a bottom surface which forms a mesa; and a beam tilting element, outside said component holding element, to change a position of a beam output from said component holding element.

16. A device as in claim 15 further comprising a magnetic coil, coupled around said mesa.

17. A device as in claim 15 further comprising a magnetic coil, coupled around said mesa, and energizable to create a vertical magnetic field approximately perpendicular to a plane of the coil.

18. A device as in claim 15 further comprising a coil, circling a portion of said second lens.

19. A device as in claim 18 wherein said second lens is a solid immersion lens.

20. A device as in claim 15 wherein said second lens has a spherical portion and a flat portion.

21. A device as in claim 20 wherein said flat surface of said second lens forms part of the air bearing surface.

22. A device as in claim 15 wherein said second lens has a partly spherical portion and a total thickness which is less than $r+r/n$ where r is a radius of the partly spherical portion and n is an index of refraction of the material.

23. A device as in claim 15 wherein said air bearing surfaces have a configuration which holds the component holding element above a storage disk by an amount less than one wavelength of the radiation energy, while the disk is rotating at a predetermined desired speed.

24. A device as in claim 15 wherein said second lens has an index of refraction between 1.4 and 2.5.

25. A method for operating an optical system in near field mode, comprising:

forming an optical element holding assembly, including a first lens coupled to a top surface thereof, and a second lens coupled to a bottom surface thereof, said first and second lenses mounted in a way such that they are positioned stationary relative to one another, and with an optically clear path between said first lens and said second lens; and configuring said bottom surface as an air bearing surface;

rotating a disk at a desired speed adjacent said air bearing surface to maintain constant a distance between the second lens and the disk to thereby automatically maintain proper focus without moving said first lens and said second lens relative to one another; and using a light direction altering element, external to the optical holding element, to tilt light output from the optical element holding assembly.

26. A method as in claim 25 wherein said light direction altering element is one of a mirror or a prism.

* * * * *